United States Patent [19]

Stafford

[11] Patent Number: 4,583,391
[45] Date of Patent: Apr. 22, 1986

[54] ADJUSTABLE GAGE STOP

[75] Inventor: David H. Stafford, Andover, Mass.

[73] Assignee: Dynamics Research Corporation, Wilmington, Mass.

[21] Appl. No.: 652,801

[22] Filed: Sep. 20, 1984

[51] Int. Cl.$^4$ .............................................. B21D 11/22
[52] U.S. Cl. .......................................... 72/461; 72/389
[58] Field of Search ............................ 72/36, 389, 461; 33/163, 164, 169

[56] References Cited

U.S. PATENT DOCUMENTS

| 4,055,070 | 10/1977 | Wingate et al. | 72/461 |
| 4,089,200 | 5/1978 | Wingate et al. | 72/389 |
| 4,192,168 | 3/1980 | DiCiaccio | 72/389 |
| 4,411,150 | 10/1983 | Klein et al. | 72/461 |

Primary Examiner—Francis S. Husar
Assistant Examiner—Jorji M. Griffin
Attorney, Agent, or Firm—Weingarten, Schurgin, Gagnebin & Hayes

[57] ABSTRACT

A simple, rugged, and conveniently front-adjustable gage stop having a gage finger capable of presenting a gage face in any of several angular orientations is disclosed. The gage stop comprises a gage finger adjustably and rotatably connected to a finger support which is in turn pivotally connected to a mounting member. In operation, a workpiece is butted against the gage face with the gage stop resting in a horizontal orientation, and some operation is performed on the workpiece. If this operation results in an upward force being applied to the gage stop, the stop swings upward in response, to a limiting position in which the center of gravity of the finger support/gage finger combination is forward of the pivot axis, and then returns by gravity to a horizontal position.

10 Claims, 6 Drawing Figures

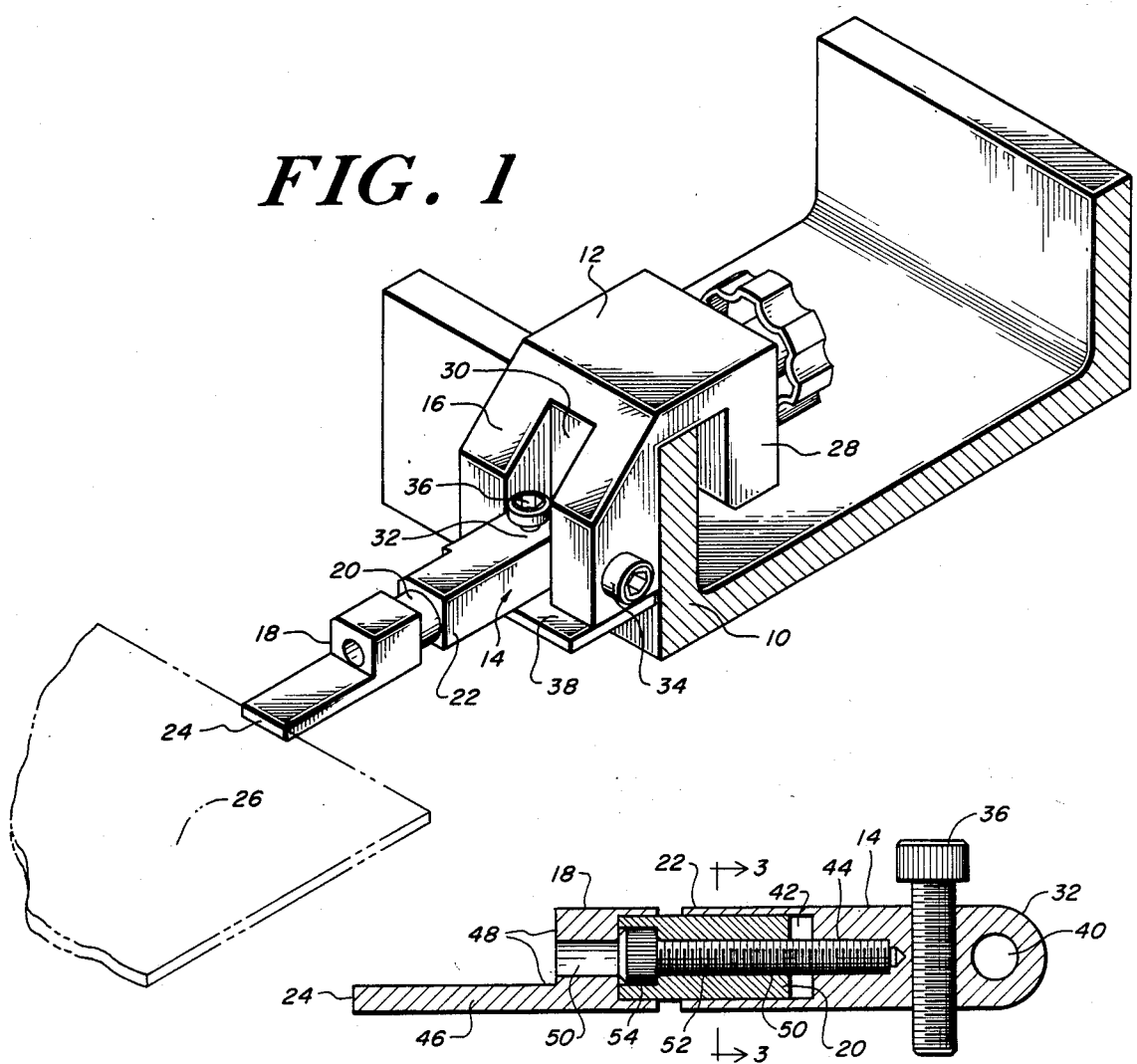
FIG. 1
FIG. 2
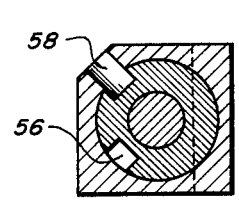
FIG. 3
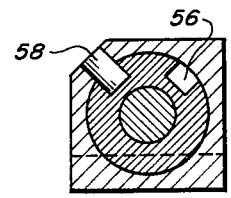
FIG. 3A

ADJUSTABLE GAGE STOP

FIELD OF THE INVENTION

This invention concerns adjustable gage stops for sheet forming and cutting machines, and more particularly a front-adjustable gage stop capable of presenting a gage face in any of several rotational orientations.

BACKGROUND OF THE INVENTION

Gaging systems for press brakes and other sheet forming and cutting apparatus are well known and generally comprise a gage bar or other element adjustably positioned as a reference against which a sheet is butted for appropriate location prior to bending, cutting, or other formation. In a press brake for forming bends in sheet metal, the gaging system, known in the art as a back gage, is disposed behind the press to serve as an adjustable stop against which sheet stock introduced from the front of the press between the forming dies is butted to position the sheet for an intended bend. It is desireable to be able to adjust the gage position easily and accurately, and to reposition the gate accurately in the event it has changed or become misadjusted. A gate stop assembly in which the gage stop is adjustable from the rear is shown in U.S. Pat. No. 4,055,070. While the invention will be described in relation to a preferred embodiment for use with a press brake, it is contemplated that the invention is more broadly useful with a variety of sheet forming and cutting machines.

SUMMARY OF THE INVENTION

The present invention provides an adjustable gage stop especially designed for use as a press brake gage. It is of simple construction yet is reliable, accurate, and can be adjusted from the front either longitudinally or rotationally. The mechanism includes a mount which is adjustably attachable to a support member, a finger support pivotally attached to the forward end of the mount and pivotable about a horizontal pivot axis orthogonal to the longitudinal axis of the finger support, and a gage finger mateable with the forward end of the finger support in any of several rotational positions and connected to it by a front-adjustable connecting means which connects the gage finger and finger support and permits longitudinal adjustment of the position of the gage finger relative to the finger support.

BRIEF DESCRIPTION OF THE DRAWING

The invention will be more fully understood from the following detailed description taken in conjunction with the accompanying drawing, in which:

FIG. 1 is a perspective view of an adjustable gage stop of the invention;

FIG. 2 is a sectional side view of the gage finger support and the gage finger;

FIG. 3 is a cross-sectional view of the combination of FIG. 2 along line 3—3, with the gage finger oriented so the gage face is vertical;

FIG. 3A is a second cross-sectional view of the combination of FIG. 1 along line 3—3, showing the gage face in a horizontal position;

DETAILED DESCRIPTION OF THE INVENTION

Figure 4:
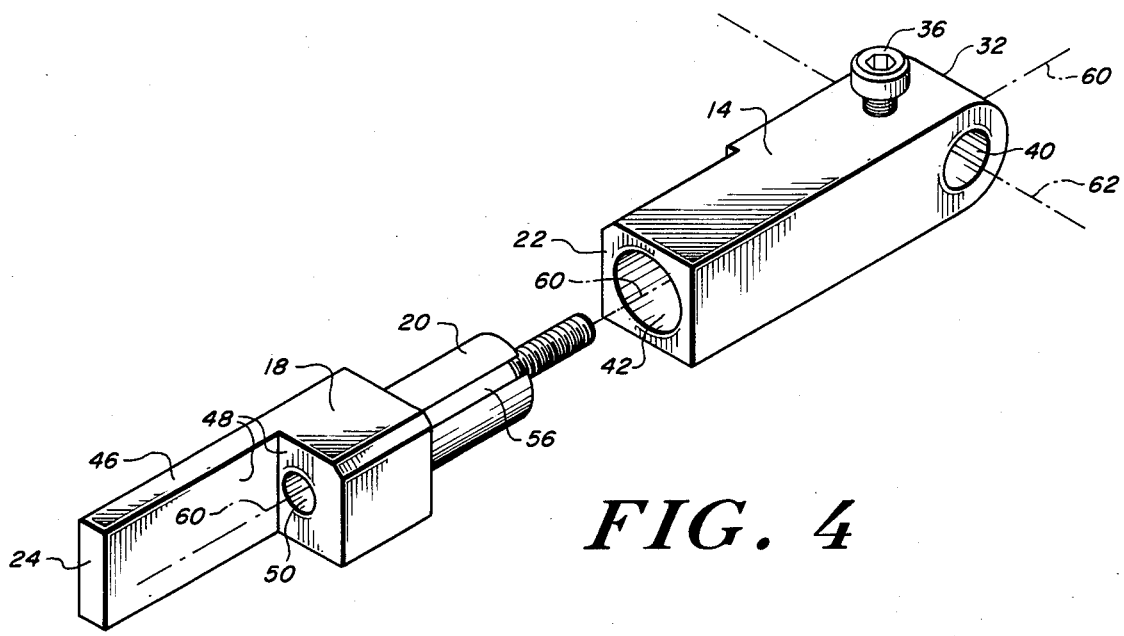
FIG. 4 is an exploded perspective view of the finger support and gage finger of the invention.

Referring to FIG. 1, there is shown an adjustable gage stop of the invention, mounted on a support member 10 of a metal forming machine such as a press brake for bending sheet metal stock. The gage stop consists of an adjustable mount 12 for attachment of the gage stop to the machine on which it is to be mounted, a finger support 14 pivotally attached to mount forward end 16, and a gage finger 18 adjustably attached at its rearward end 20 to finger support forward end 22. The foremost end of the gage finger 18 constitutes the gage face 24, which contacts the workpiece 26. Mount rearward end 28 is clamped to support member 10 by any appropriate mechanism which will permit it to be moved along support member 10 to desired positions. Mount forward end 16 possesses a vertical channel 30 having a width sufficient to accept finger support rearward end 32. Channel 30 is spanned by a horizontal axle 34 which serves to attach finger support 14 to mount 12, and to permit finger support 14 to pivot upwards into channel 30 in response to an upward force. An adjustment mechanism 36, such as a vertical screw threaded through finger support 14, is located forward of the horizontal axle 34 and contacts mount forward end 16 at a portion such as plate-like portion 38, permitting adjustment of finger support 14 in the vertical plane.

As shown in FIG. 2, finger support 14 possesses in its rearward end 32 a horizontal bore 40 which accepts horizontal axle 34 for pivotal attachment of finger support 14 to mount 12. Forward of horizontal bore 40 is shown adjustment mechanism 36, as for example a vertically-oriented screw threaded through finger support 14. Finger support forward end 22 possesses a longitudinally-oriented cavity 42 having a threaded hole 44 at its base and on its longitudinal axis. Gage finger rearward end 20 fits within the longitudinally-oriented cavity 42 and can slide longitudinally along the longitudinal axis of finger support 14. Gage finger 18 has a blade-like portion 46 projecting from its forward end 48. The forwardmost end of this blade-like portion 46 is gage face 24. Gage finger 18 possesses a longitudinal bore 50 along the axis of the gage finger rearward end 20, terminating at the forward end 48. Longitudinal bore 50 contains an adjustable connecting means 52 for joining finger support 14 and gage finger 18, and adjusting the position of gage finger 18 relative to finger support 14 longitudinally. In the embodiment shown, adjustable connecting means 52 is a screw, the head of which is held within gage finger 18 and freely rotatable therein, its shaft extending from gage finger rearward end 20 to mate with threaded hole 44 of finger support 14. An adjustment control 54, in the embodiment the head of the screw, is accessible via longitudinal bore 50 from the gage finger forward end 48, thereby permitting the position of gage finger 18 to be adjusted longitudinally with respect to finger support 14 by adjustments made from the front of the gage stop.

As shown in FIGS. 3 and 3A, gage finger 18 may be set in any of several rotational orientations with respect to finger support 14. In the embodiment illustrated, this is accomplished by providing the gage finger rearward end 20 with several longitudinal channels 56 and providing the longitudinally-oriented cavity 42 of finger support 14 with an aligning key 58 which projects into cavity 42 and tracks any of the longitudinal channels 56, causing gage finger 18 to be held in one of several rotational orientations relative to finger support 14.

Figure 5:
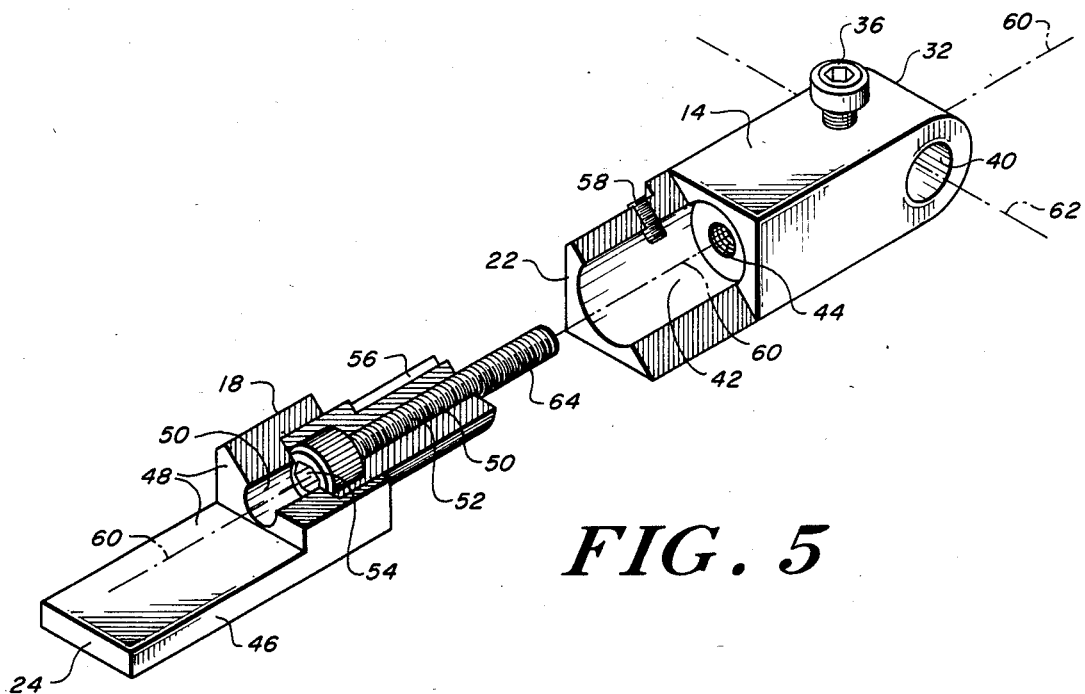
FIG. 5 is a partly cut away exploded perspective view of the finger support and gage finger of FIG. 4.

FIGS. 4 and 5 illustrate the longitudinal axis 60 of the finger support/gage finger combination, and the horizontal pivot axis 62 which is the axis of horizontal bore 40. It is to be noted that the longitudinally-oriented cavity 42 in finger support 14 and the gage finger rearward end 20 are both symmetical about the longitudinal axis of finger support 14 and gage finger 18 respectively. In the embodiment illustrated, cavity 42 and gage finger rearward end 20 are cylindrical, but this geometry is by no means required. FIGS. 4 and 5 further illustrate the mechanism by which gage finger 18 is connected to finger support 14 in any of several possible rotational orientations, aligning key 58 tracking any of several longitudinal channels 56 in the gage finger rearward end 20. Gage finger 18 is connected to finger support 14 by adjustable connecting means 52. In the illustrated embodiment adjustable connecting means 52 is a screw the head of which is held within gage finger 18, both head and shaft being freely rotatable, the shaft 64 extending from the gage finger rearward end 20 and mating with threaded hole 44 in finger support 14. To adjust the position of gage finger 18 longitudinally relative to finger support 14, adjustment control 54, in the embodiment the head of the connecting screw, is turned to rotate screw shaft 64 in threaded hole 44 and thereby move gage face 24 forward or rearward as desired. It is clear from the figures that this operation is readily conducted from the front or forward end 48 of gage finger 18.

The invention is not to be limited by what has been particularly shown and described except as indicated by the appended claims.

What is claimed is:

1. An adjustable gage stop, comprising:
   a mount having a forward end and rearward end, the rearward end being adjustably attachable to a support member;
   a finger support having a forward end, a rearward end, and a longitudinal axis therebetween, the rearward end being pivotally attached to the forward end of said mount and pivotable about a horizontal pivot axis orthogonal to the longitudinal axis, the forward end having a longitudinal cavity and means for retaining a gage finger in said selected rotational positions with respect to the longitudinal axis;
   a gage finger having a forward end and a rearward end, the rearward end having a portion mateable with the cavity in the forward end of the finger support, and having means cooperative with the retaining means of the finger support for maintaining the finger in said selected rotational positions, the forward end having a gage face;
   adjustable connecting means, cooperative with said finger support and said gage finger, for connecting said finger support and said gage finger and adjusting the position of said gage finger relative to said finger support along its longitudinal axis, said adjustable connecting means including an adjustment control operative from the forward end of said gage finger for providing such longitudinal adjustment.

2. The gage stop of claim 1 wherein:
   the forward end of said gage finger further comprises a blade-like portion terminating in the gage face, and the rearward end of said gage finger is symmetrical about the longitudinal axis thereof;
   said gage finger also containing a longitudinal bore along the axis of the rearward end and terminating at the forward end of the gage finger, to contain the adjustable connecting means and provide front access to the adjustment control.

3. The gage stop of claim 1 wherein the rearward mateable portion of said gage finger further comprises a plurality of longitudinal channels; and
   the longitudinal cavity of said finger support further comprises an aligning key projecting from the side of the longitudinal cavity into it, so that in operation the aligning key tracks any of the channels of the gage finger, causing the gage finger to be held in one of a plurality of rotational orientations relative to said finger support.

4. The gage stop of claim 1 wherein said mount possesses a vertical channel in its forward end with a horizontal axle thereacross whose axis is coincident with the horizontal pivot axis of said finger support.

5. The gage stop of claim 1 wherein the rearward end of said finger support further comprises a transverse horizontal bore whose axis is the horizontal pivot axis; and
   the longitudinally-oriented cavity in the forward end of the finger support is symmetrical about the longitudinal axis thereof and mateable with the rearward portion of said gage finger in selected rotational positions, said cavity having in its base and along its longitudinal axis a threaded hole.

6. The gage stop of claim 5 wherein the adjustable connecting means comprises a screw longitudinally held within said gage finger and freely rotatable therein, the shaft of which extends from the rearward end of said gage finger and mates with the threaded hole in the cavity of said finger support, so that upon rotation of the screw, the gage finger is moved longitudinally relative to the finger support.

7. The gage stop of claim 5 further comprising:
   an adjustment mechanism adjustably disposed through said finger support forward of the transverse horizontal bore, contacting and cooperative with the forward end of said mount so that upon movement of said adjustment mechanism said finger support is variously positioned in the vertical plane.

8. The gage stop of claim 7 wherein said adjustment mechanism comprises a vertically-oriented screw threaded through said finger support.

9. The gage stop of claim 7 wherein the forward end of said mount comprises a plate-like portion extending under said finger support and contacting said adjustment mechanism.

10. The gage stop of claim 7 in which said adjustment mechanism and transverse horizontal bore of said finger support, and the vertical channel of said mount are mutually configured so that said finger support may only attain angles of less than 90° with respect to the horizontal in response to an upward force, so that upon removal of such upward force, said finger support returns to a horizontal orientation by gravity.

* * * * *

UNITED STATES PATENT AND TRADEMARK OFFICE
CERTIFICATE OF CORRECTION

PATENT NO. : 4,583,391
DATED : April 22, 1986
INVENTOR(S) : David H. Stafford

It is certified that error appears in the above—identified patent and that said Letters Patent is hereby corrected as shown below:

Column 1, line 63, "FIG. 1" should read --FIG. 2--.

Signed and Sealed this

First Day of December, 1987

Attest:

DONALD J. QUIGG

*Attesting Officer*  *Commissioner of Patents and Trademarks*